G. W. PARSONS.
Axle-Lubricator.
No 60,049
Patented Nov. 27, 1866
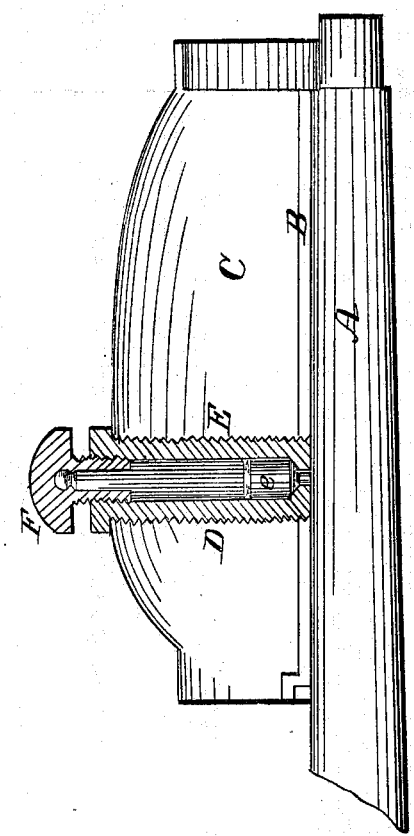
Witnesses:
A. A. Seatman
T. Lehmann
Inventor,
George W. Parsons
Alexander & Mason.
Attys.

United States Patent Office.

IMPROVEMENT IN DEVICE FOR LUBRICATING CARRIAGE-AXLE JOURNALS, &c.

GEORGE W. PARSONS, OF HARRISBURG, PENNSYLVANIA.

Letters Patent No. 60,049, dated November 27, 1866.

SPECIFICATION.

TO ALL WHOM IT MAY CONCERN:

Be it known that I, GEORGE W. PARSONS, of Harrisburg, in the State of Pennsylvania, have invented certain new and useful improvements in Devices for Lubricating the Axles of Vehicles; and I do hereby declare that the following is a full, clear, and exact description of the same, reference being had to the accompanying drawings and to the letters of reference marked thereon.

The object of my invention is to provide a plan by which axles of vehicles may be lubricated without removing the wheels from the axles or removing the fastenings by which the wheels are retained in their places, and at the same time making certain the flow and delivery of the lubricating material upon the axle, (whether congealed or not,) and also the retention of the lubrication on the axle where it belongs.

In the drawings, H represents the axle of a vehicle, C a portion of the hub, and B a portion of a box in the hub for the axle to rest and run in. D represents a pipe or tube, with a thread cut upon its external surface, which said tube is inserted in an opening made through the hub and box to the axle, as shown. The lower portion of the tube, after being screwed into the box, B, is turned off, so as to be flush with and correspond with the internal surface of said box. A small opening is left in the bottom of the tube, over which a valve fits to make a tight joint. The inside of the tube is finished up smooth, and its diameter above the valve-opening being uniform, except near the top, where it is made slightly larger. Inside of the tube is fitted a plunger, e, the bottom of which is ground so as to form a valve for the opening in the tube. This plunger is made large enough to fit snugly in the opening in the tube above the valve seat. This piston or plunger is provided with a stem, E, which extends to and over the top of the tube. The tube is closed at its top by means of a cap, F, which is screwed into it. This cap is hollow for a part of its length, just far enough so that when the piston is in its place, and the said cap screwed down, the piston will be held firmly in its seat by the caps bearing upon the upper end of the stem, thus effectually closing the lower end of the tube.

In using this invention, I take off the cap, remove the piston, and fill the tube with lubricating material. I then put the piston back, push it down, and then screw on the cap. The plunger, as it goes down, forces the oil through the opening in the lower part of the tube and into the box and around the axle.

This improvement can be applied to vehicles now in use as readily as to those which are being made. The advantages of this improvement are obvious, to wit: the saving of labor required to raise the wheel from the ground and to remove the wheel from the axle; the time required to lubricate a wheel is very materially shortened; the operation of oiling is rendered neat and clean, and can be performed on the road while the team is attached; the oil can be supplied to the axle without danger of gritty substances being applied with it, and can be applied with certainty and retained at any temperature of the weather.

Having thus fully described my invention, what I claim, is—

The screw plug or tube D, in combination with the plunger e, with its stem, and the cap F, constructed as and for the purpose herein specified.

As evidence that I claim the foregoing, I have hereunto set my hand in the presence of two witnesses.

GEO. W. PARSONS.

Witnesses:
   H. K. PARSONS,
   CHAS. A. PARSONS.